I. H. WILSEY & W. H. GREEN.
HEAT RATIO INDICATOR.
APPLICATION FILED AUG. 13, 1915.

1,268,196.

Patented June 4, 1918.
2 SHEETS—SHEET 1.

FIG. 1.

UNITED STATES PATENT OFFICE.

IRVEN H. WILSEY AND WALTER H. GREEN, OF CHICAGO, ILLINOIS, ASSIGNORS, BY DIRECT AND MESNE ASSIGNMENTS, OF ONE-HALF TO SAID GREEN AND ONE-HALF TO FRANK A. ADKINS, OF CHICAGO, ILLINOIS.

HEAT-RATIO INDICATOR.

1,268,196.  Specification of Letters Patent.  Patented June 4, 1918.

Application filed August 13, 1915. Serial No. 45,386.

*To all whom it may concern:*

Be it known that we, IRVEN H. WILSEY and WALTER H. GREEN, citizens of the United States, residing at Chicago, in the county of Cook and State of Illinois, have invented certain new and useful Improvements in Heat-Ratio Indicators, of which the following is a specification.

This invention relates to apparatus for indicating the ratio of the amount of heat contained in a liquid or gas to the amount of heat contained in some other liquid or gas, or in the same liquid or gas at some other time or place.

In an application for Letters Patent filed Dec. 11, 1912, Serial No. 736,073, for improvements in methods of determining heat ratios, a method for determining heat ratios is set forth with much particularity, and one of the objects of our invention is to provide suitable mechanism for carrying out the method therein set forth. In an application for Letters Patent filed by Irven H. Wilsey on the 17th day of May, 1915, Serial No. 28,556, for improvements in apparatus for determining heat ratios, the general principles upon which our present invention is based are set forth with much detail, and reference may be had to this and to said former application for a fuller understanding of the method and the principles involved in our invention.

One object of our invention is to provide apparatus for indicating heat ratios which is not only simple and inexpensive but which may be used where very high temperatures are involved.

Another object of our invention is to provide an apparatus for the purpose which includes means for eliminating certain errors which frequently are neglected, and an apparatus which, for other reasons, produces very accurate results.

Our invention is applicable to all cases where it is desired to determine or compare relative amounts of heat, but it has particular reference to the determination or indication of heat ratios, or the comparison of heat ratios, in heat utilizing apparatus where it is desired to have indicated from time to time, or continuously, the working conditions of the apparatus particularly with reference to its efficiency; it being understood, as is fully set forth in said application, that the efficiency of a heat utilizing apparatus may ordinarily be determined by determining the ratio between the relative amount of heat-energy conveyed to the apparatus by means of some substance and the relative amount of heat-energy contained by the same substance as it passes away from, or no longer affects, the apparatus. By relative amount of heat-energy we mean the amount in excess of that contained by the substance when it is at a certain temperature, such as zero degrees, or the room temperature.

The particular application which we make, in this instance, of our apparatus for indicating heat ratios is to a furnace and boiler; and the object of this particular application is to determine the efficiency of the furnace and boiler system by indicating the ratio of the relative amount of heat in the combustion gases as they pass away from the boiler flues to the relative amount of heat in the gases as they pass from the combustion chamber of the furnace into the boiler flues.

In the accompanying drawings Figure 1 indicates a common form of furnace and boiler, with certain heat susceptible devices which we use, applied thereto.

Figure 1:
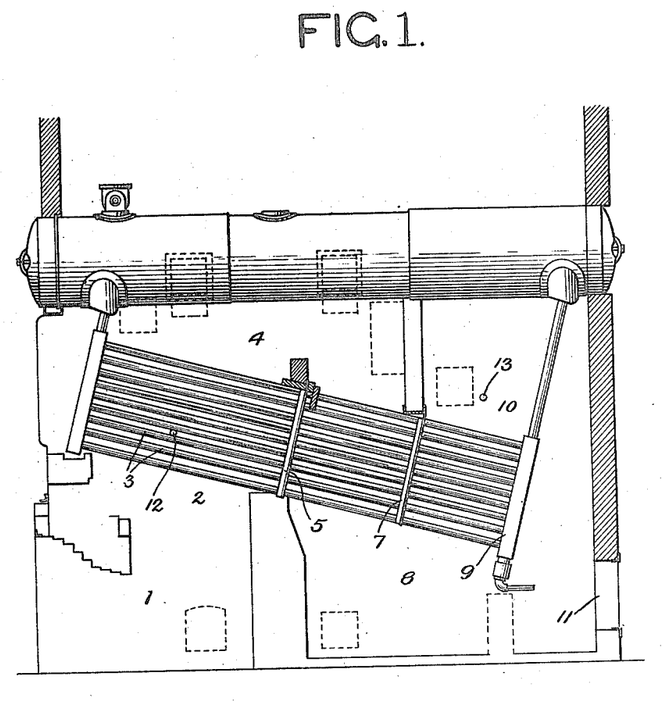

In the drawings 1 indicates the firebox of the boiler. The hot gases generated in the firebox by the combustion of fuel pass into the chamber 2 beneath the boiler tubes 3. The gases then pass between the tubes 3 into the chamber 4; then downwardly between the baffles 5 and 7 into the chamber 8; and then upwardly, between the plate 7 and the end baffle 9, into the uptake chamber 10, around the rear side of the baffle 9 and out of the chimney 11.

Figure 2:
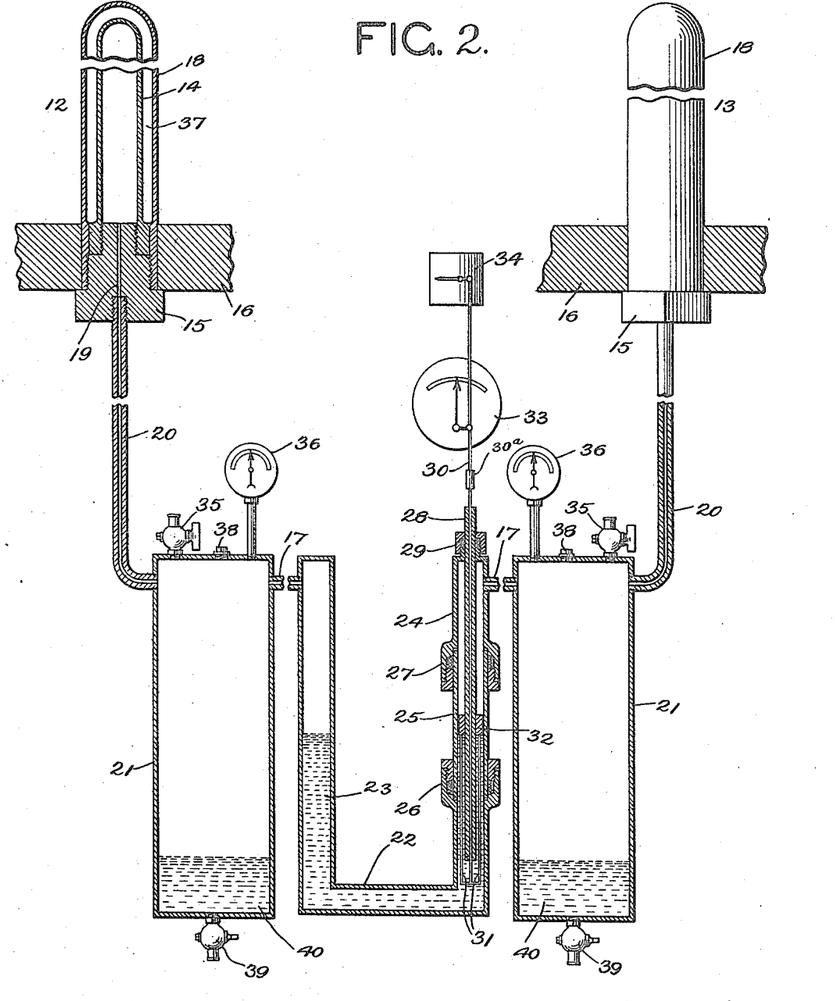
Fig. 2 shows, somewhat diagrammatically, an apparatus which embodies the features of our invention.

A heat-susceptible device 12 is located among the tubes of the boiler adjacent the combustion chamber 2, and another heat-susceptible device 13 is located above the rear end of the tubes in the uptake chamber 10. These devices may be located in any convenient place in or near the passageways of the boiler. In practice we prefer to place them where indicated in the drawings, and for convenience herein we consider the devices to be respectively in the furnace and in the uptake. These heat-susceptible devices are constructed in the following manner, in this particular instance, although exact details of the construction are immaterial: A tube 14 is threaded onto one end of a plug 15. This tube may be made of any suitable material; we prefer for the purpose in this instance a tube of steel piping, which is sealed at its free end in any suitable manner. A protecting shell 18 surrounds the tube 14, and is threaded onto the plug 15 and fixed in the wall 16 of the boiler as indicated in Fig. 2. This shell also may be made of any suitable material, but for the purpose we prefer also steel tubing. The plug 15 has a capillary bore passing through the central portion of the plug.

When in use these heat-susceptible devices are filled with some suitable gas. We prefer for the purpose an inert gas or gases that will not at high temperatures affect the material of which the tubes are made, particularly a mixture of gases similar to the flue gases which are being generated in the combustion chamber with the oxygen and other active gases eliminated. The purpose of the devices is to receive heat from the combustion gases as they pass through the flues of the boiler, thus causing the gases in the inner tubes 14 to assume substantially the same temperatures as the flue gases and to affect, by expansion or contraction of the gases, the indicating apparatus. The devices are so connected with the apparatus hereinafter described, as to cause the apparatus to be affected by, and to suitably indicate, the variations in pressure of the gases in the tubes 14, due to the variations in temperature of the gases therein, which in turn are due to the variations in temperature of the flue gases of the boiler.

Each of the heat-susceptible devices is connected, by means of a capillary tube 20, to a vessel 21. The volume of each of the vessels 21 bears a certain ratio to the volume of the associated tube 14 in order to produce the desired results, as is hereinafter described. Each of the vessels 21 is connected by a capillary tube 17 to a U tube 22 which contains a sufficient amount of mercury 23 to properly indicate variations in pressure of the gases in the tubes 14 due to the variations in temperature thereof. The branch 24 of the U tube 22 has a central portion 25 composed of glass, for convenience in observing the action of the mercury, the respective ends of the glass tube being suitably connected to the tubes forming the remainder of the branch 24 by means of the stuffing boxes 26 and 27. A tube 28 passes through the upper end of the branch 24 of the U tube, and is sealed therein by means of the stuffing box 29. The tube 28 passes downwardly into the branch 24 a very material distance in the mercury in the tube, thus forming a mercury seal which prevents the escape of gas from the tube 28 into the air. A wire or rod 30 projects outwardly from said tube 28 and passes freely therethrough downwardly into the mercury, and has branches 31 passing upwardly and connected to a float 32 which rests upon the surface of the mercury.

It is evident that as the mercury in the branch 24 rises or falls the float 32 will rise or fall accordingly, and will carry with it the rod 30. The projecting ends of this rod are connected in any suitable manner to a suitable indicating apparatus 33, and also to a suitable recording apparatus 34. Any suitable means may be provided for varying the positions of the indicating members of the indicating and recording apparatus with reference to the position of the float, so as to vary the scale readings or for any other purpose. We prefer in practice the varying means comprising a turnbuckle 30$^a$ by the use of which the length of the rod 30 may be varied as desired.

It will appear from a consideration of this apparatus that any variation in pressure of the gas in one of the tubes 14 will cause a variation in the elevation of the float 32 and of the indicating wire 30, providing the pressure in the other tube remains constant; or any variation in the difference of the pressures in the two tubes will cause a corresponding variation in the elevation of the indicating wire 30.

Pet cocks 35 are inserted in the upper ends of the vessels 21 for the purpose of removing gas therefrom or inserting gas therein. When the apparatus is installed the air may be removed from the vessel and tubes, by the use of any suitable means, in order to fill the cylinders and tubes with gas such as passes through the flues of the system. The pet cocks then may be connected, by means of suitable tubes, with the interior of the passageways of the system through which the flue gases pass, and upon opening the cocks the tubes and vessels of the system will be filled with the gas. By the use of pressure gages 36 the absolute or the relative pressures may be adjusted as desired.

It is desirable in operation to protect the tubes somewhat from the intense heat of the flue gases; and partly for this reason shells 18 are provided. But, in case of high temperatures, there is a tendency for the gases contained in the tubes 14 to pass through the walls of the tubes, and as a consequence a slight leakage into or out of the tubes may result in use. To eliminate this or reduce it to a negligible quantity the shells 18 are also of value. The chambers 37, formed by the walls of the tubes 14 and the shells 18, become filled with gases in composition and pressure intermediate the composition and pressure of the gases inside the tubes 14 and outside the shells 18, and the leakage tendency is thus materially reduced. This tendency is also reduced by having the gas contained in the tubes of the same general composition as the flue gas.

Also in order to prevent leakage, and for other reasons, it is sometimes desirable to reduce the pressure in the tubes 14 which would result when the tubes are heated to high temperatures, and this may be done by opening the pet cocks 35 when the tubes are at such high temperatures and allowing some of the gas to escape; or, if necessary, some of the gas may be removed through the pet cocks by the use of any suitable air-exhausting means.

It is also sometimes desirable to vary the relative capacities of the vessels 21 and the tubes 14. To this end any suitable means may be provided; in this instance we use plugs 38 and cocks 39. Any suitable material may be passed into either cylinder through the plug opening, and when desired more or less of the material may be removed by opening the cock. We prefer mercury 40 for the material in this instance. It is evident that the capacity of the vessel will be reduced in proportion to the volume of the mercury introduced.

The vessels 21 used in conjunction with the tubes 14 also materially reduce the pressures in the tubes 14 and hence the leakage tendency. The gas in either tube 14 as it heats expands and some of it passes out into the vessel associated therewith; the gas thus entering the cylinder quickly cools to the room temperature, contracts, and thus allows more hot gas to pass out of the tube into the vessel. So that, if the vessel is of any material size, the pressure in the tube 14, even at the maximum temperatures is not particularly excessive, although when at the room temperature the gas in the tube may be at atmospheric pressure.

The vessels 21 also reduce the effect of leakage aside from the reduction in pressure. If the vessel is equal in capacity to its associated tube it is evident that the error, due to leakage through the walls of the tube 14, would be very materially reduced because the loss would be distributed between both vessels; and when in use the amount of gas would be only about one-fifth as much as in the external vessel, as the absolute temperature of the tube would be five times as great.

*Capacity variations.*

The relative capacities of the vessels and the tubes also affect the relative pressures on the mercury. Hence, because of these various effects of the vessels on the system, for a clear understanding of the invention it becomes desirable to derive an equation giving the pressure in terms of other magnitudes, such as capacities, temperatures, and masses.

We may base such a derivation upon the fundamental equation

Mass×temperature=pressure×a constant, neglecting, for the present, errors that arise due to the fact that this equation is not exact, especially for gases near the condensing or the dissociating temperature.

Let $M$=the mass in the tube 14 when at room temperature.
$v$=the volume capacity of the tube 14.
$v'$=the capacity of vessel 21 and the connecting tubes.
$m$=the mass of gas in the tube 14 when at working temperature.
$m'$=the mass of gas in the vessel 21 when at room temperature.
$t$=the furnace absolute temperature.
$t'$=the uptake absolute temperature.
$T$=the room absolute temperature.
$p$=the working pressure in the furnace system of vessels.
$p'$=the working pressure in the uptake system of vessels.
$r=v'/v$ for the furnace system.
$r'=v'/v$ for the uptake system.

Assuming equilibrium of temperatures and pressures to exist at any furnace temperature we have:

$$mt=cp=m'Tv/v', \text{ and } m'/m=tv'/Tv.$$

$tv'/Tv$ is therefore the ratio between the masses, and hence there are $tv'/Tv+1$ parts of gas each equal to $m$. But the total gas equals $M+Mv'/v$ units. Hence $$m=(M+Mv'/v)/(tv'/Tv+1) \text{ units.}$$

Hence $$p=\frac{t}{c}(M+Mv'/v)/(tv'/Tv+1). \quad (1)$$

The pressure, therefore, is directly proportional to the original mass M, and may be varied by varying M.

Assuming the room temperature T and the original mass M, each to be unity, and the volume to be such as to produce 1 atmosphere of pressure at room temperatures, $c$ becomes equal to 1, and we have $$p=t(1+v'/v)/(1+tv'/v.) \quad (2)$$

If the absolute temperature in the furnace=2500° F. which is perhaps common for combustion chamber temperatures, and the room absolute temperature is 500° F., the unit of temperature thus being 500°, we have $$p = 5(1-v'/v)/(1-5v'/v')$$

Hence
When $v'=0$, $p=5$ atmospheres.
When $v'=v$, $p=1\ 2/3$ atmospheres.
When $v'=2v$, $p=1\ 4/11$ atmospheres.
When $v'=3v$, $p=1\ 1/4$ atmospheres.

Evidently then the maximum pressure in the tube 14 may be regulated by varying the relative capacities of the vessel and the tube, as well as by varying the initial amount of gas in the tube.

However, inasmuch as the object of our invention is to indicate heat ratios by means of both tubes, it is necessary to show that the tubes and their corresponding vessels are properly adjusted to correctly affect the indicating apparatus so far as the temperatures of the flue gases are concerned, and also to transform the temperature effects so that heat-energy effects will be indicated. And in the particular application of our invention which we have selected in this instance we shall finally consider relative, or excess temperatures and amounts of heat energy rather than absolute temperatures and amounts of heat energy.

*Absolute temperature ratios.*

The instruments 33 and 34 may be calibrated so as to indicate the ratio between the temperatures of the gases in the tubes 14; but this calibration will depend upon the differences between the pressures in the tubes. So that for equal ratios we must have equal differences in pressures; and in general the pressure difference should be proportional to the temperature ratios. If the absolute temperature in the furnace where the tube is located is 2500° F., and the temperature in the uptake is 1000° F., the ratio will be 2.5. When the furnace is at 3000° F., and the uptake at 1200° F., the ratios will also be 2.5; and the respective differences of the pressures in the two cases must be equal. Hence one degree rise in temperature in the uptake should affect the pressure indicating apparatus two and one-half times as much as a degree rise in the furnace.

We may produce this result by properly adjusting the relative capacities of the vessels 21 and the tubes 14, as will be seen by the following:

From equation (2) we have:

$$p - p' = t(1-r)/(1-tr) - t'(1-r')/(1-t'r') \quad (3)$$

Now, it is desired to have $p-p'$ constant when $t/t'$ is constant.

Differentiating equation (2) we have $$\frac{dp}{dt} = (1-r)/(1-rt)^2 \quad (4)$$

which gives the rate of change of $p$ with reference to $t$; and $$\frac{dp'}{dt'} = (1-r')/(1-r't')^2 \quad (5)$$

In order to have $p-p'$ always constant when $t/t'$ is constant, the rate of change of $p$ must be $t'/t$ times the rate of change of $p'$. Hence if $t=2.5t'$ we must have, $$\frac{(1-r)/(1-rt)^2}{(1-r')/(1-r't')^2} = 1/2.5 \quad (6)$$

Assuming the average values of $t$ and $t'$ to be respectively 2500° and 1000°, or 5 and 2 of our 500 units; and assuming $r$ equals $r'$, we have $$(1-5r)^2/(1-2r)^2 = 1/2.5, \quad (7)$$

and $r = .316$.

Hence, if we make each external vessel with its connecting tubes with .316 times the capacity of the tubes 14, the differences in the pressures produced will be substantially constant as long as the ratio of the temperatures is constant, providing the range in temperatures is not too great. As the temperatures vary either way materially from the average an error will enter; but it will be negligible for ordinary working temperatures. The following table illustrates these facts:

From (2), $$p = \frac{1.316t}{1-.316t} \qquad p' = \frac{1.316t'}{1-.316t'}.$$

We then have from these equations the following results:

| $t$ | $t'$ | $t/t'$ | $p$ | $p'$ | $p-p'$ |
|---|---|---|---|---|---|
| 4.5 | 1.8 | 2.5 | 2.445 | 1.510 | .935 |
| 5. | 2. | 2.5 | 2.550 | 1.613 | .937 |
| 5.5 | 2.2 | 2.5 | 2.644 | 1.708 | .936 |

Hence in a total variation in temperature of 22% the maximum variation from the average indication is about .1%.

In general, then, in order to maintain constant differences in pressures with constant temperature ratios, we vary the relative capacities of the external and internal vessels so as to make the ratio of the rates of change of the pressures with reference to the respective temperatures substantially equal to the inverse ratio of the average temperatures.

This adjustment always causes the differences in pressures to be substantially proportional to the ratios of the temperatures for any ordinary working temperatures, as may be seen by a consideration of the above table. With $t$ and $t'$ respectively 4.5 and 1.8, $p-p'=.935$; and with $t$ and $t'$ respectively 5.5 and 1.8 $p-p'=1.134$; the temperature ratio increase and the pressure difference increase each being substantially 22%. The pressure differences also may be made substantially proportional to the temperature ratios by varying the ratio $r$ of one system only, in case it should be desired to have some particular ratio for the other system. For instance in case of the uptake system let $r'=1$; from equation (6) if $t$ and $t'$ average respectively 5 and 2, we have $$2(1-5r)^2/(1-r)(3)^2=2.5, \text{ and } r=.67.$$

When this adjustment is made, however, the error necessarily will be greater as $r$ and $r'$ are unlike.

The heat susceptible device 12 in this instance I have shown above the combustion chamber 2, among the water tubes of the boiler. Evidently the temperature of the flue gases in this portion of the passageway will be less than in the combustion chamber. So that if it is desired to indicate the ratio of the temperature of the combustion chamber gases to the temperature of the uptake gases, it will be necessary either to place the device 12 in the combustion chamber or to compensate for the lower temperature of the surrounding gas. For practical reasons it is frequently undesirable to place the device in the combustion chamber, as the high temperature there may, at least in time, injure the device or cause undue leakage.

The temperatures of the gases surrounding the device 12 ordinarily are substantially proportional to the temperatures of the gases in the combustion chamber. Hence to correct for the cooler position of the device we vary the relative capacities of the vessels, as hereinabove explained, so that the differences of the pressures, due to the temperatures of the gas surrounding the devices, will be proportional to the ratios of the temperatures of the gases in the combustion chamber and in the uptake; and it is necessary only to apply the proper correction factor, or properly calibrate the scale of the instrument to indicate the correct effect of such temperatures.

For instance, if the temperature of the device 12 is 4/5 that of the combustion chamber, the ratio of the average temperature of the devices would be 4/5 times as much as before or, 2. But in order to correct for the difference in temperature between the combustion chamber and device 12 the ratio of the rates of the changes of the pressure should equal $1/2 \times 4/5=5/8$ and the value of $r$ determined by a value of $t4/5$ times as great as before, becomes .19 instead of .316.

Relative temperature ratios.

So far we have considered only absolute temperatures. In many cases it is desirable to consider relative temperatures; that is, temperatures with relation to some standard temperature; for instance temperatures in excess of the room temperature. This is desirable as the basis of the consideration of the efficiency of heat utilizing apparatus such as furnaces and boilers, as in such cases relative heat energy only is involved. Hence before considering heat ratios it will be well to consider briefly relative temperature ratios.

It is evident that the ratio of the rates of change of the pressures with reference to the relative temperatures would be just the same as with reference to the absolute temperatures, as the actual temperatures and the heat units remain the same. For instance if we indicate the room temperature absolute by T and the furnace and uptake relative temperatures, respectively, by $t''$ and $t'''$, equation (2) becomes $$p=(t''-T)(r-1)/(1-r(t''-T))$$

and $$\frac{dp}{dt''} / \frac{dp}{dt'''} = \left(\frac{1-r(t''-T)}{1-r(t'''-T)}\right)^2 = \left(\frac{1-rt}{1-rt'}\right)^2 = \text{equation (2)}$$

However the ratio of the relative temperatures $t''/t'''$ would equal $(t-T)/(t'-T)$ or if, for convenience we let 500° absolute, or 1 of our arbitrary units, $t''/t'''=4$ and to compensate for the differences in temperature of the furnace and the uptake $r$ should be determined by the equation $$(1-rt)^2/(1-rt')^2=1/4, \text{ of } 1/3$$

if, as before, the absolute temperature of the device 12 is 4/5 that of the combustion chamber, and to correct for this the ratio would be $1/3 \times 4/3=4/9$.

Relative heat energy ratios.

The apparatus as above described gives results relating only to temperatures. In order to give results relating to heat-energy any suitable means may be employed so as to vary the effect of the temperatures upon the indicating instrument in proportion also to the specific heats and the masses of the gases. If, for instance the specific heat of the furnace gases is 3/2 times that of the uptake gases, in order to indicate the effects of the amounts of heat-energy rather than the effects of the temperatures, it is necessary for the heat-susceptible device in the furnace to affect the indicator, per degree rise in temperatures, 3/2 times as much as the indicator is affected by the other device.

A consideration of the error due to the cooler position of device 12 will show that, under the conditions assumed, the actual effects of the device should be varied so as to equal the effects which would result if the temperatures of the device 12 were 5/4 times as great, 4/3 in case of relative temperatures. The effect of the specific heats may be considered in a similar manner. Inasmuch as we are dealing with temperature or heat ratios, the actual values of the specific heats are immaterial so long as the ratio thereof is known. We may assume, for instance, the value of the specific heat in the uptake to be 1, then, if the ratio of the specific heat of the gas in the furnace to the specific heat of that in the uptake is 3/2, say, the actual specific heat of the gas in the furnace would be 3/2. We may then ignore the specific heat of the uptake gas, and vary the value of $r$, so as to cause the temperature of the furnace to produce such effect on the pressure differences as it would produce if it were 3/2 times as great and were thus equal to the product of the temperature and the specific heat.

In such a case $r$ would be determined by setting the ratio of the rates of change of the pressures equal to the product of the inverse ratio of the relative temperatures of the devices and the direct ratio of the specific heats of the surrounding gases; or in case of the ratio of the average temperatures given above of 4 we would have $1/4 \times 3/2$ or 3/8 equal to the ratio of the rates of change of the pressures. And if it is desired at the same time to compensate for the differences in temperatures between the combustion chamber and the device, the ratio of the rates of change would equal $1/3 \times 4/3 \times 3/2$ or 2/3, assuming as before, 4/3 to be the ratio between the two furnace relative temperatures.

This, however does not take into consideration the fact that, at high temperatures, the pressure of gases at constant volume, ordinarily, is not exactly proportional to the temperatures. The specific heat of the gas contained in the tubes is immaterial, as the gas without reference to its specific heat will be substantially of the same temperature as the flue gases. But if the pressure of the contained gas does not vary as the temperature varies, this error may also be compensated for, if desired, according to the method of compensating for the specific heats of the flue gases.

For instance, suppose the rate of the gas pressure increase relative to the temperature were 1/2 as great in tube 12 in the furnace as in tube 13 in the uptake. Evidently a degree rise in temperature in the furnace would have only one-half as much effect on the pressure indicator as in case of a similar rise in temperature in the uptake. To compensate for this we multiply by 2 the ratio used for determining the value of $r$, as hereinabove explained.

Inasmuch as the mass of gas passing through the passageway of the boiler is ordinarily substantially unchanged in quantity, it is not usually necessary to correct for the amount of gas surrounding or passing the heat-susceptible devices. But, if for any reason, it is desired to determine the heat ratio magnitude of the two gases per unit volume a similar adjustment is made. The ratio, for instance, of the densities of the substances is determined in any suitable manner, and the inverse ratio used for determining the value of $r$, as explained above, is multiplied by this density ratio. If both the densities and the specific heats are simultaneously considered it is necessary only to multiply the inverse ratio used for determining $r$ by the product of the ratios of the specific heats and the densities of the surrounding gases.

In general, in order to compensate for any number of factors relating to the gases in the furnace and the uptake, and affecting dissimilarly the indicating apparatus, the ratio of the capacities of the vessels and the tubes should be varied according to the product of the respective inverse or direct ratios of the factors so that the effects of the factors on the indicating instrument will be as desired. This may be made clearer by considering the following set of conditions:

Let the ratio of the relative temperatures of the devices 12 and 13 be 3,

The ratio of the relative temperatures of the combustion chamber and the device 12, 4/3, The ratio of the specific heats, 3/2, The ratio of the gas densities, 1/2.

The ratio of the rate of pressure variations in the systems, 1/2.

As explained above, to compensate for these various factors the ratio of the rates of change of the pressure effects of the devices 12 and 13 should be inversely as the ratio of the furnace and uptake temperatures, directly as the ratio of the two furnace temperatures, directly as the ratio of the specific heats and the gas densities, and inversely as the ratios of the rates of the pressure variations in the two systems. Hence the ratio of the effects and thus the formula for $r$ should equal $1/3 \times 4/3 \times 3/2 \times 1/2 \times 2$, or 2/3. We should, therefore, in determining the value of $r$ set the ratio of the rates of change of the pressures with reference to the respective temperatures equal to 2/3. With the value thus obtained for $r$ the actual temperatures affecting the devices would give pressure differences proportional to the ratios of the heat-energy in the combustion chamber and in the uptake gases.

In practice it is, of course, not necessary to make, in case of each installation, the above described mathematical determinations. Similar installations will require similar adjustments, and any suitable tests of the efficiency of the apparatus may be made either to obtain the required adjustments or to check up on the adjustments arrived at theoretically; and other errors than those hereinabove considered may be compensated for by adjusting the relative capacities of the vessels in accordance with such theoretical determinations or tests, or in any other suitable manner.

*Mass variations.*

These various factors which, if not compensated for, cause errors in the readings of the instrument, may be compensated for by varying the relative masses of gas in the two systems, as well as by varying the capacity ratio $r$.

Considering again absolute temperatures only, suppose it is desired to have $r$, $r'$, and $m'$, each equal to 1, and $m$ of such value as to cause the pressure differences to be proportional to the temperatures; we need only, as before, to set the ratio of the rates of changes of the pressures equal to the product of the inverse or direct ratios of the factors to be compensated for. Suppose we wish to compensate merely for the ratio of the furnace and the uptake temperatures; from equations (1), (4), (5), and (6) we have $$\frac{m'(1-r')/(1-r't')^2}{m(1-r)/(1-rt)^2} = 1/2.5; \quad (8)$$

And if $m'$, $r$ and $r'$ each equal 1, and $t$ and $t'$ are respectively 5 and 2, substituting these known values we have $m=1.6$.

This however causes the pressure in the furnace tube 14 to be much greater than in the uptake tube 14, while it is desirable to have the pressures nearly equal, so as to be substantially equal to the pressures of the gases surrounding the devices.

By making the values of $r$ and $r'$ each .2, say, the value of $m$ becomes .82 and the pressure difference is .746 for the average temperature ratio; while when $m=1.6$, as above, the pressure difference is 1.33. Finally if we make $r$ and $r'$ each equal to zero, that is if we eliminate the external vessels, $m'/m$ becomes equal to the products of the ratios of the factors to be compensated for, and the pressure of differences for the average temperatures becomes zero. The percentage of the error, however, for other temperatures would be serious.

Similar compensations, by varying $m$, may be made with reference to relative temperatures and heat contents in accordance with the process hereinabove indicated with reference to $r$.

*Efficiency indications.*

Evidently the indicating scale adopted on the instrument may be varied to suit any desired conditions. It may be calibrated to read directly the actual efficiency or the actual heat-ratios in any particular instance. In either case, it is evident that the relative ratios due to varying conditions would be indicated.

With reference to this, the following may be of value:

The ordinary efficiency formula $(h-h')/h$, where $h$ and $h'$ are the respective heat magnitudes, when expressed in terms of temperature masses and specific heats, would become $(tms-t'm's')$, where $m$ and $m'$ are the respective masses.

Now, inasmuch as the masses and the specific heats are constant for any particular case, we may, for simplicity, use the formula $(t-t')/t$, which equals $1-t'/t$. Evidently, therefore, the simple ratio $t'/t$ answers every purpose of the differential ratio, because, as the simple ratio decreases the differential ratio will increase; and as the pointer of the indicator passes in one direction to indicate a decrease in the simple ratio, which is the actual ratio that affects the apparatus, it would at the same time indicate an increase in the differential ratio, and hence an increase in efficiency.

Hence if it is desired to indicate directly variations in the efficiency $(h-h')/h$ we need only to set equation (7) or (8), as before, equal to the product of the average value of $t''/t'''$ and the other factors to be compensated for, and to properly calibrate the indicator scale.

It is to be understood however, that the invention is not limited in its application to furnaces and boilers or to any particular apparatus or substances or art; but the invention may be applied wherever it is desired to determine or compare temperatures or heat magnitudes with reference to any substances or objects located or used in the same or in different devices or apparatuses, and whether the substances or objects are adjacent to or remote from each other; and various modifications and changes in the apparatus for carrying out the invention may be made by those skilled in the art without departing from the spirit of the invention as disclosed by the following claims.

And it should be further understood that herein, we have set forth facts and theories only as they appear to us, and merely as explanatory of the apparatus and the methods of its use. Hence, any errors or misconceptions with reference to such matters are not to be considered as affecting the merits of our invention.

We claim as our invention:

1. The combination of a boiler, hollow vessels positioned in the hot gas passageway of said boiler, gas in each of said vessels, a pressure operable indicating device, and tubes operatively connecting each of said vessels with said device, the composition of the gas in said devices being substantially similar to the composition of ordinary boiler flue gas.

2. The combination of a boiler, hollow vessels positioned in the hot gas passageway of said boiler, gas in each of said vessels, a pressure operable indicating device, tubes operatively connecting each of said vessels with said device, and means for varying the masses of gas in said vessels.

3. The combination of a boiler, hollow vessels positioned in the hot gas passageway of said boiler, gas in each of said vessels, a pressure operable indicating device, and tubes operatively connecting each of said vessels with said device, the composition of the gas in said vessels being substantially similar to the composition of ordinary flue gas, the capacities of said vessels being substantially equal but the masses of gas therein being unequal.

4. The combination of a boiler, a hollow vessel positioned in the furnace of said boiler, a hollow vessel positioned in the uptake of said boiler, gas in each of said vessels, a pressure operable indicating device, and tubes operatively connecting each of said vessels with said device; the respective products of the mass and the temperature of the gases in said vessels being substantially equal when the vessels are respectively at the average working temperatures of the gases in the furnace and in the uptake of the boiler.

5. The combination of a boiler, a hollow vessel positioned in the furnace of said boiler, a hollow vessel positioned in the uptake of said boiler, gas in each of said vessels, a pressure operable indicating device, and tubes operatively connecting each of said vessels with said device; the pressure of the gases in each of said vessels, when the vessel is at the working temperature of the gas surrounding it, being approximately equal to the pressure of the surrounding gas.

6. The combination of a boiler and means for indicating the relative amounts of heat energy in the gases at two points of said boiler; said means comprising a closed vessel located at each of said points, gases contained in said vessels, relative pressure operable indicating apparatus, tubes operatively connecting each of said vessels with said apparatus, and means for varying the relative pressure effects of said contained gases according to the relative specific heats of the gases surrounding said vessels.

7. The combination of a boiler, hollow vessels positioned in the hot gas passageway of said boiler, a closed jacket surrounding each of said vessels, gas in each of said vessels, a pressure operable indicating device, and tubes operatively connecting each of said vessels with said device, said gas being of a composition substantially similar to that of the gas in said passageway.

8. The combination of a boiler, hollow vessels positioned in the hot gas passageway of said boiler, a closed shell surrounding each of said vessels, gas in each of said vessels, a pressure operable indicating device, tubes operatively connecting each of said vessels with said device, and means for varying the amount of gas in one of said vessels.

9. A relative temperature indicating apparatus comprising two closed vessels, a relative pressure operable indicating device, tubes operatively connecting each of said vessels with said device, gas in each of said vessels, and means for varying the amount of gas in one of said vessels.

10. A relative temperature indicating apparatus comprising two closed vessels, a relative pressure operable indicating device, tubes operatively connecting each of said vessels with said device, and gas in each of said vessels.

11. A heat ratio indicating apparatus comprising two closed tubes, gases contained in each of said tubes, two hollow vessels, a relative pressure operable indicating apparatus, a tube operatively connecting each of said closed tubes with one of said vessels, a tube operatively connecting each of said vessels with said pressure indicating apparatus, and means for varying the relative densities of the gases in said tubes.

12. A heat ratio indicating apparatus comprising two closed tubes, gases contained in each of said tubes, two hollow vessels, a relative pressure operable indicating apparatus, a tube operatively connecting each of said closed tubes with one of said vessels, and a tube operatively connecting each of said vessels with said pressure indicating apparatus.

13. A relative heat energy indicating apparatus comprising two closed vessels, a relative pressure operable indicating device, tubes operatively connecting each of said tubes with said device, gas in each of said tubes, and means for varying the pressure effects of said gases on said device according to the product of the specific heats and the temperatures of the fluid surrounding said tubes.

14. The combination of a boiler, and means for indicating the relative temperatures of the gases in said boilers; said means comprising a plurality of vessels located in the hot gas passageways of said boiler, a plurality of vessels outside of said boiler, tubes operatively connecting each of said internal vessels with one of said external vessels, pressure operable indicating apparatus, and tubes connecting each of said external vessels with said apparatus.

15. An efficiency indicating apparatus comprising two hollow vessels adapted to be placed in the hot gas passageway of a boiler, two other hollow vessels, tubes operatively connecting each of said first mentioned vessels with one of said second mentioned vessels, a relative pressure operable indicating apparatus, and tubes connecting each of said second mentioned vessels with said apparatus.

16. The combination of a boiler; a closed tube located in each of two points in said boiler; two closed vessels outside of said boiler; a tube operatively connecting each of said tubes with one of said vessels, thus forming two closed systems; gases contained in each of said systems; a relative pressure operable indicating apparatus; a tube connecting each of said systems with said apparatus; and means for varying the relative volume capacities of said vessels.

17. The combination of a boiler; a closed tube located in each of two points in said boiler; two closed vessels outside of said boiler; a tube operatively connecting each of said tubes with one of said vessels, thus forming two closed systems; gases contained in each of said systems; a relative pressure operable indicating apparatus; and a tube connecting each of said systems with said apparatus.

18. The combination of a boiler; a closed tube located in each of two points in said boiler; two closed vessels outside of said boiler; a tube operatively connecting each of said tubes with one of said vessels, thus forming two closed systems; gases contained in each of said systems; a relative pressure operable indicating apparatus; a tube connecting each of said systems with said apparatus; and means for varying the relative pressure effects of said gases on said apparatus.

19. The combination of a boiler; two closed systems, each of said systems comprising a closed tube located in said boiler, a closed vessel outside of said boiler, and a tube operatively connecting said tube with said vessel; gases contained in each of said systems; a relative pressure operable indicating apparatus; a tube connecting each of said systems with said apparatus; and means for varying the relative densities of the gases in said systems.

20. The combination of a boiler; two closed systems, each comprising a closed tube located in said boiler, a closed vessel outside of said boiler, and a tube operatively connecting said tube with said vessel; gases contained in each of said systems; a relative pressure operable indicating apparatus; a tube connecting each of said systems with said apparatus; and means for varying the relative capacities of one of said vessels with reference to the capacity of its associated tube.

21. The combination of a boiler; a hot-gas tube located in each of two points in said boiler; two closed vessels outside of said boiler; a tube operatively connecting each of said hot-gas tubes with one of said vessels, thus forming two closed systems; gases contained in each of said systems; a relative pressure operable indicating apparatus; a tube connecting each of said systems with said apparatus; means for varying the relative capacities of one of said vessels with reference to the capacity of its associated hot-gas tube, and means for varying the relative amounts of gases in said system.

22. A heat ratio indicating apparatus comprising two hollow systems, each system comprising two closed vessels and a connecting tube, a gas contained in each system, a relative pressure operable indicating device, a tube connecting each system with said device, and means for varying the relative pressure effects of said systems on said device proportional to the respective products of the temperatures and the specific heats of the fluids surrounding one of said vessels in each of said systems.

23. A heat ratio indicating apparatus comprising two hollow systems, each system comprising two closed vessels and a connecting tube, a gas contained in each system, a relative pressure operable indicating device, a tube connecting each system with said device, the differences in pressure of the gas in said systems when said apparatus is in operation being substantially proportional to the ratio of the heat energy in the respective fluids surrounding one of said closed vessels in each of said systems.

24. The combination of a furnace and a boiler; a closed system comprising a tube positioned adjacent said furnace, a vessel outside of said boiler, and a pipe operatively connecting said tube with said vessel; a second closed system comprising a second tube positioned adjacent the uptake of said boiler, a second vessel outside of said boiler, and a pipe operatively connecting said second tube with said second vessel; a differential pressure indicating device; a tube operatively connecting each of said systems with said device; and gases contained in said systems and tubes.

25. The combination of a boiler; a closed system comprising a tube positioned adjacent the furnace of said boiler, a vessel outside of said boiler, and a pipe operatively connecting said tube with said vessel; a second closed system comprising a second tube positioned adjacent the uptake of said boiler, a second vessel outside of said boiler, and a pipe operatively connecting said second tube with said second vessel; a differential pressure indicating device; a tube operatively connecting each of said systems with said device; and inert gases contained in said systems and tubes.

26. The combination of a boiler; a closed system comprising a tube positioned adjacent the furnace of said boiler, a vessel outside of said boiler, and a pipe operatively connecting said tube with said vessel; a second closed system comprising a second tube positioned adjacent the uptake of said boiler, a second vessel outside of said boiler, and a pipe operatively connecting said second tube with said second vessel; a differential pressure indicating device; a tube operatively connecting each of said systems with said device; and gas contained in said systems and tubes; the differences in pressures of the gases in said systems being substantially proportional to the ratio of the heat energy per unit mass in the hot gases passing through said boiler when said boiler is in operation, and the said pressures being substantially equal under average working conditions.

27. The combination of a boiler; a closed system comprising a tube positioned adjacent the furnace of said boiler, a vessel outside of said boiler, and a pipe operatively connecting said tube with said vessel; a second closed system comprising a second tube positioned adjacent the uptake of said boiler, a second vessel outside of said boiler, and a pipe operatively connecting said second tube with said second vessel; a differential pressure indicating device; a tube operatively connecting each of said systems with said device; and gas contained in said systems and tubes; the differences in pressures of the gases in said systems being substantially proportional to the ratios of the heat energy per unit mass in the hot gases passing through said boiler when said boiler is in operation, and the said pressures being approximately equal to the pressures of the gases in said boiler under average operating conditions.

In testimony whereof we hereunto set our hands.

IRVEN H. WILSEY.
WALTER H. GREEN.

Copies of this patent may be obtained for five cents each, by addressing the "Commissioner of Patents, Washington, D. C."